United States Patent [19]

Rietmüller

[11] 4,128,859
[45] Dec. 5, 1978

[54] ILLUMINATION DEVICE FOR INDICATOR INSTRUMENTS

[75] Inventor: Karl-Heinz Rietmüller, Frankfurt, Germany

[73] Assignee: VDO Adolf Schindling AG, Frankfurt am Main, Germany

[21] Appl. No.: 778,030

[22] Filed: Mar. 16, 1977

[30] Foreign Application Priority Data

Mar. 18, 1976 [DE] Fed. Rep. of Germany ....... 2611434

[51] Int. Cl.² ........................................... G01D 11/28
[52] U.S. Cl. .................... 362/26; 116/129 L; 362/32
[58] Field of Search ...................... 362/26, 27, 29, 31, 362/32; 116/129 L; 40/130 K

[56] References Cited

U.S. PATENT DOCUMENTS

| | | | |
|---|---|---|---|
| 2,214,595 | 9/1940 | Rights | 362/27 |
| 2,507,035 | 5/1950 | Maynard | 362/31 |
| 2,561,756 | 7/1951 | Shook | 362/32 X |

*Primary Examiner*—Richard L. Moses
*Attorney, Agent, or Firm*—Martin A. Farber

[57] ABSTRACT

A device for the illumination of the instrument dials of two or more indicator instruments which are accommodated in one common housing, particularly of the indicator field of a combination instrument for motor vehicles. A single rod-like light transmitting element extends over a substantial part of the length of the housing and is illuminated on at least one end by a light source. A reflection surface is provided on a side of the light transmitting element facing away from the indicator field.

13 Claims, 4 Drawing Figures

ILLUMINATION DEVICE FOR INDICATOR INSTRUMENTS

The present invention relates to a device for the illumination of the instrument dials or panels of two or more indicator instruments which are accommodated in one common housing, particularly of the indicator field of a combination instrument for motor vehicles, with light transmitting elements and light sources.

Devices are already known by which two incandescent lamps are provided for the illumination of an indicator field of customary size, which lamps are arranged in the rearward portion of the housing and illuminate the indicator field over respectively one light transmitting element each projecting into the space between the viewing pane and the indicator field, which elements are arranged transverse to the longitudinal axis of the housing. With indicator fields of larger dimensions, three such incandescent lamps and three light transmitting elements which are arranged along the longitudinal axis of the housing spaced adjacent one another, are used for the illumination. These known devices have the disadvantage that a somewhat uniform degree of illumination of the indicator field is relatively difficult, and in many cases generally is not, to be obtained. Moreover these devices are comparatively expensive in construction parts and have an unfavorable assembly construction which is disadvantageous with respect to the costs of the product.

It is an object of the present invention to provide an illumination device for the illumination of the instrument dials of at least two indicator instruments of the introductory mentioned type which avoids the above-mentioned disadvantages.

It is another object in accordance with the present invention to provide a device with which without difficulties a non-objectionable illumination of an indicator field is possible, and which possesses a construction which has a reduced number of construction parts, is favorable in assembly and advantageous in complete or manufactured construction. This object of the invention is solved in accordance with another object of the present invention by providing a single rod-like light transmitting element which extends over a substantial part of the length of the housing and which is illuminated on at least one end by a light source and on its side facing away from the indicator field a reflection surface is provided which directs the light toward the indicator field.

By these measures in accordance with the present invention, a device is provided of exceptionally simple construction, is easily producable and assembleable in comparison to the known devices, and by which an unobjectionable illumination of the indicator field is possible without difficulties and with a minimum of construction parts.

In one preferred embodiment of the invention, the light transmitting element is illuminated on one end by one light source and is provided with a reflection surface on the other end. Such an embodiment brings therewith the advantage that for the illumination of an indicator field of customary size, merely one single light source is required. It is evident that such a type of device which merely comprises one light transmitting element and one incandescent lamp is exceptionally simple to produce and to assemble, and as a consequence of this involves a minimum cost.

With the illumination of indicator fields of smaller dimensions, under circumstances an embodiment form can be of advantage in which the light transmitting element is illuminated on one end by a light source and on the other end is provided with an absorption surface. By the application of an absorption surface on the end of the light transmitting element which faces away from the light source, the following is prevented: when the element on the basis of a small indicator field falls out or fails comparatively quickly, on the light source free end, by the light reflection occurring there, a light quantity per unit length is emitted which is increased in comparison to the other element sections. On the other hand, with the illumination of an unconventionally large indicator field, it can be of advantage to illuminate the light transmitting element on both ends, respectively, by a light source, respectively.

It has proven advantageous to provide a light transmitting element, on its side which is remote from or turned away from the indicator field, with the reflection surface which directs the light toward the indicator field.

In this manner the efficiency of the device can be substantially increased. Moreover it has been shown advantageous to provide the reflection surface with a degree of reflection which changes along the length of the light transmitting element such that a uniform and continuous light quantity emission per unit length is provided over the longitudinal axis of the element. The application of such a reflection surface is particularly recommended when the light transmitting element is comparatively longitudinally elongated and is illuminated with a single source of light.

In one preferred embodiment, the photoconductive element is impinged with light from the rearward portion of the housing over at least one light transmitting projection. By this measure the possibility exists to be able to accommodate the light source in the rearward part of the housing. This has effect particularly with the use of the device for the illumination of indicator fields in combination instruments, since there the arrangement of the incandescent lamp in the rearward part of the combination housing is an unalterable demand or requirement. The light transmitting projection per se in and for itself at any optional position of the light transmitting element can be connected with the latter. Under the assumption that the light transmitting element is illuminated only by one light source, it has been proven advantageous based on photo-optical technological grounds to arrange the light transmitting projection on one end of the element. Furthermore, it is recommended to allow the light transmitting projection to pass or transfer into the element per se with a bend or elbow. With respect to a non-constant or non-uniform transfer with a reflection surface, which in principal would also be possible, this brings about the advantage that a larger light quantity arrives in the light transmitting element.

In one embodiment form which is preferred on the basis of manufacturing- and assembling- techniques, the projection(s) and the element form an integral unit. This unit, made of a light transmitting synthetic material or plastic, for example polymethylmetacrylate, can be produced in a single working process by injection molding processes.

With the above and other objects and advantages in view, the present invention will become more clearly understood in connection with the following detailed description of a preferred embodiment, when considered with the accompanying drawing, of which:

Figure 1:
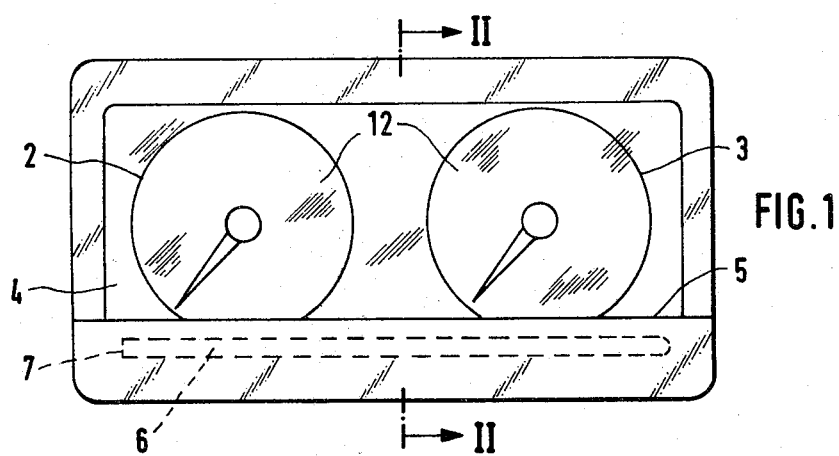
FIG. 1 is a front view of a combination instrument for motor vehicles with two indicator instruments.
Figure 3:
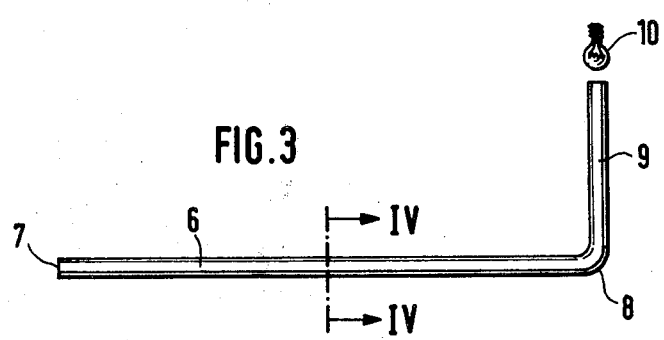
FIG. 3 is a plan view of the light transmitting element of the combination instrument according to FIG. 1.

Referring now to the drawings, the combination instrument which is illustrated in highly reduced scale comprises a housing frame 1, in which the two indicator instruments 2 and 3 are disposed, such as for example a speedometer and a tachometer, and a clear viewing pane 4, the latter being secured by means of screws or adhesive to the housing frame 1 or is glued or welded on the housing frame 1. A screen or shield 5 is arranged in the lower part of the combination instrument between the housing frame 1 and the viewing pane 4. A rod-like light transmitting element 6 is located behind the screen 5, which light transmitting element 6 extends over approximately the entire length of the housing frame 1.

The light transmitting element 6 is provided with a reflection surface 7 at its left end in the drawing, and passes over a bend or elbow 8 on its other end into a light transmitting projection 9, the latter projecting rearwardly and being illuminated by an incandescent lamp 10. The incandescent lamp is disposed in a lamp socket 11 on the rearward part of the housing frame 1.

Figures 2, 4:
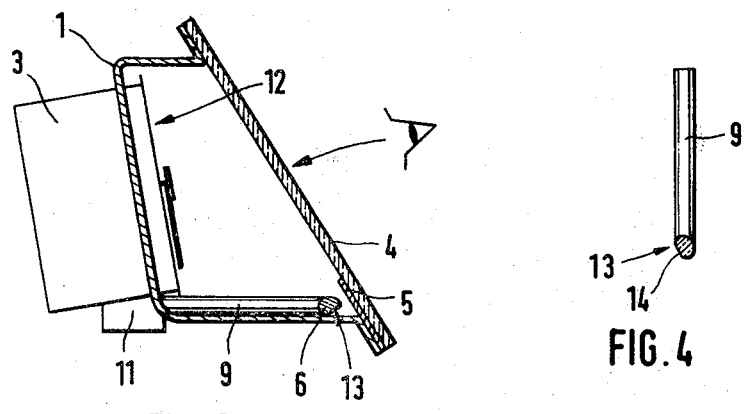
FIG. 2 is a section of the combination instrument according to FIG. 1 taken along the line II—II thereof.
FIG. 4 is a section taken along the lines IV—IV of FIG. 3 through the light transmitting element.

For increasing the quantity of light which emerges from the element 6, which light is directed toward the indicator field 12, the element 6 is provided with a reflection surface 13 on its side which is remote from, i.e., turned away from the indicator field 12. The reflection surface 13 is formed with a reflecting coating or covering through a phase 14. As illustrated in FIGS. 2 and 4, the phase 14 provided with the reflecting coating is flattened so as to be directed toward the indicator field 12.

While there have been disclosed several embodiments of the present invention, these embodiments are given by example only and not in a limiting sense.

I claim:

1. A device for the illumination of the instrument dials of at least two indicator instruments which are accommodated in a common housing, particularly of the indicator field of a combination instrument for motor vehicles, comprising
   one housing,
   at least two indicator instruments having an indicator field mounted in said one housing,
   a light source mounted in said housing behind said indicator field,
   a single rod-like light transmitting element extending linearly over a substantial part of the length of said housing spaced relative to said indicator field, and said light transmitting element having at least one end portion thereof extending rearwardly and having a free end disposed so as to be illuminated by said light source,
   said light transmitting element having a smoothly formed surface throughout and has an outer side along its length facing away from said indicator field,
   reflection surface means on said outer side of said light transmitting element for directing light toward said indicator field.

2. The device as set forth in claim 1, wherein
   said light source constitutes at least one light source,
   said light transmitting element is illuminated on both ends thereof, respectively, by said at least one light source.

3. The device as set forth in claim 2, wherein
   said at least one light source constitutes two light sources,
   said light transmitting element is illuminated on each end thereof by one of said two light sources, respectively.

4. The device as set forth in claim 1, wherein
   said light transmitting element has two ends, one of said ends is illuminated by said light source, and the other of said ends points away from said indicator field and has a reflecting surface.

5. The device as set forth in claim 1, wherein
   said light transmitting element has two ends, one of said ends is illuminated by said light source, and the other of said ends has an absorption surface thereon.

6. The device according to claim 1, wherein
   said side of said light transmitting element is flat and directed toward said indicator field, and constitutes a flat portion.

7. A device for the illumination of the instrument dials of at least two indicator instruments which are accommodated in a common housing, particularly of the indicator field of a combination instrument for motor vehicles, comprising
   a housing,
   at least two indicator instruments having an indicator field mounted in said housing,
   a light source mounted in said housing,
   a single rod-like light transmitting element extending over a substantial part of the length of said housing, and said light transmitting element having at least one end thereof disposed so as to be illuminated by said light source,
   said light transmitting element has a side along its length facing away from said indicator field,
   reflection surface means on said side of said light transmitting element for directing light toward said indicator field,
   said reflection surface means has a varying reflection degree along the length of said light transmitting element such that over a longitudinal axis of said light transmitting element a uniform light quantity emission per unit length is provided.

8. The device according to claim 1, wherein
   said light source is disposed in a rearward part of said housing,
   said at least one end portion comprises at least one light transmitting projection operatively facing said light source connected to said light transmitting element, the latter receiving light from said light source via said at least one light transmitting projection.

9. The device according to claim 8, wherein
   said at least one light transmitting projection is arranged on one end of said light transmitting element.

10. The device as set forth in claim 9, wherein
    said light transmitting element is formed with a bend, said one light transmitting projection transfers via said bend into said light transmitting element, said projection and said light transmitting element and said bend form a substantially L-shaped member with said light transmitting element extending linearly and spaced relative to said indicator field.

11. The device according to claim 8, wherein said at least one light transmitting projection and said light transmitting element constitute an integral unit.

12. The device according to claim 7, wherein said reflection surface means constitutes a reflecting coating on said side of said light transmitting element.

13. A device for the illumination of the instrument dials of at least two indicator instruments which are accommodated in a common housing, particularly of the indicator field of a combination instrument for motor vehicles, comprising a housing, at least two indicator instruments having an indicator field mounted in said housing, a light source mounted in said housing, a single rod-like light transmitting element extending over a substantial part of the length of said housing, and said light transmitting element having at least one end thereof disposed so as to be illuminated by said light source, said light transmitting element has a side along its length facing away from said indicator field, reflection surface means on said side of said light transmitting element for directing light toward said indicator field, said side of said light transmitting element is flat and directed toward said indicator field, and constitutes a flat portion, said housing constitutes a housing frame, said housing frame has a rear portion housing said at least two indicator instruments side by side, and a front portion formed with flanges inclined relative to said indicator field, said flanges define an opening therebetween, said light transmitting element extends in said housing completely linearly in front of and under said at least two indicator instruments parallel to said indicator field, a clear viewing pane secured to said flanges of said housing frame, said clear viewing pane has a lowermost edge and defines an angle relative to said indicator field, a screen secured between said lowermost edge of said clear viewing pane and said flanges of said housing frame, said screen projects upwardly beyond said flanges into said opening above the level of said light transmitting element, said screen laterally extends across said indicator instruments parallel to said light transmitting element, said light transmitting element is disposed adjacent said screen with said flat portion extending substantially perpendicularly to said screen.

* * * * *